United States Patent
Streuber

(10) Patent No.: US 11,573,066 B1
(45) Date of Patent: Feb. 7, 2023

(54) SEMI-ACTIVE LASER PULSE STACKING

(71) Applicant: RAYTHEON COMPANY, Waltham, MA (US)

(72) Inventor: Casey T. Streuber, Oro Valley, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 494 days.

(21) Appl. No.: 16/800,957

(22) Filed: Feb. 25, 2020

(51) Int. Cl.
*F41G 7/22* (2006.01)

(52) U.S. Cl.
CPC ........... *F41G 7/2293* (2013.01); *F41G 7/226* (2013.01)

(58) Field of Classification Search
CPC .............................. F41G 7/2293; F41G 7/226
USPC ........................................................ 356/4.01
See application file for complete search history.

(56) References Cited

U.S. PATENT DOCUMENTS

| | | | | |
|---|---|---|---|---|
| 2009/0323047 | A1* | 12/2009 | Karazi | G01S 17/66 356/28 |
| 2010/0067608 | A1* | 3/2010 | Tyree | F41G 7/2246 375/259 |
| 2022/0137185 | A1* | 5/2022 | Schleuning | H01S 5/06253 356/5.01 |

OTHER PUBLICATIONS

International Search Report for corresponding International Application No. PCT/US2020/028086, filed Apr. 14, 2020, International Search Report dated Oct. 20, 2020 and dated Oct. 28, 2020 (4 pgs.).
Written Opinion of the International Searching Authority for corresponding International Application No. PCT/US2020/028086, filed Apr. 14, 2020, Written Opinion of the International Searching Authority dated Oct. 28, 2020 (6 pgs.).

* cited by examiner

*Primary Examiner* — Samir Abdosh
(74) *Attorney, Agent, or Firm* — Lewis Roca Rothgerber Christie LLP

(57) ABSTRACT

A Semi-Active Laser sensor for determining a line-of-site to a target includes: a receiver for receiving a plurality of target pulses; a processor for starting a target track for pulses that cross a noise threshold opening a pulse gate within the target track; and for every laser pulse received within the pulse gate crossing the noise threshold, determining a time index relative to the pulse gate center; and a memory for storing the pulses that cross the noise threshold and their respective time index, wherein the processor further temporally offsets the stored pulses based on their corresponding time indexes, sums the offset pulses together to generate a summed pulse signal, and determines the line-of-sight error to the target from the summed pulse signal.

18 Claims, 3 Drawing Sheets

SEMI-ACTIVE LASER PULSE STACKING

FIELD OF THE INVENTION

The disclosed invention generally relates to semi-active laser systems and more specifically, to systems and method for semi-active laser pulse processing.

BACKGROUND

A projectile or missile system may be directed to a target or a target position by means of a laser signal from an off-board system. This mode of a missile seeker is typically referred to as semi-active laser. The semi-active laser sensor detects a laser signal, performs processing of the laser pulse, and provides line-of-sight error signals to the missile guidance processor.

Laser guidance is used by the military to guide a missile or other projectile or vehicle to a target by a laser beam. With semi-active laser guidance, a laser is kept pointed at the target and the laser radiation bounces off the target and is scattered in all directions (this is known as "painting the target", or "laser painting"). The missile, projectile, etc. is launched or dropped somewhere near the target. When it is close enough for some of the reflected laser energy from the target to reach it, a laser sensor on the projectile detects which direction (reflection of) the laser is coming from and adjusts the projectile trajectory towards its source. In a SAL technique, the missile itself is only a passive detector of a laser signal, which is provided by an external source and reflected off a target.

Semi-active laser systems detect and track objects by processing reflections from non-cooperative targets in a cluttered environment. Accordingly, a semi-active laser system must have a sensor with low noise (low signal-to-noise ratio), high dynamic range and high linearity. Most semi-active laser systems use a compact optical system to collect radiation and a segmented photo-diode to determine the angle the radiation is received from via simple centroid calculations The role of a laser signal tracker is to process laser pulses received as reflections from the laser designator off of a target (which typically occurs at a time interval on the order of tens of milliseconds and to determine those temporal sequences of detections belonging to the same target, while rejecting any detections believed to be false alarms. In addition, the laser signal tracker is able to use the sequence of detections over time to not only obtain a smoothed estimate of the current line-of-sight error, but also a current smoothed velocity state of the target. When several targets are present, the laser signal tracker tries to provide one track for each target, with the track history often being used to indicate where the target has come from.

Semi-Active Laser (SAL) sensors are used to guide missiles and other projectiles via a coded laser signal pointed at a target, from an external (laser) source. The SAL sensors are typically mounted near an inertial measurement unit (IMU) on the projectiles. The IMU is an electronic device that measures and reports the projectile's specific force, angular rate, and sometimes the orientation. Given volume constraints within these missiles and projectiles, the aperture size of these sensors and thus the strength of the reflected laser signal the guided projectile can receive from a target is determined almost entirely by the payload size. As desired targets move from standard military vehicles to commercial vehicles, the required payload reduces, but the required sensor sensitivity increases due to low reflectivity. Increased sensitivity independent of aperture size is thus desired and requires a new approach and system architecture.

SUMMARY

In some embodiments, the disclosed invention is a method and system for determining a line-of-sight error to a target with a Semi-Active Laser (SAL) sensor.

In some embodiments, the disclosed invention is a method for determining a line-of-sight error to a target with a Semi-Active Laser (SAL) sensor. The method includes: receiving a plurality of target pulses; starting a target track for pulses that cross a noise threshold; opening a pulse gate within the target track; for every laser pulse received within the pulse gate crossing the noise threshold, determining a time index relative to the pulse gate center and stored in a memory; temporally offsetting the stored pulses based on their corresponding time indexes; summing the offset pulses together to generate a summed pulse signal; and determining the line-of-sight error to the target from the summed pulse signal.

In some embodiments, the disclosed invention is a Semi-Active Laser (SAL) sensor for determining a line of site to a target. The SAL includes: a receiver for receiving a plurality of target pulses; a processor for starting a target track for pulses that cross a noise threshold opening a pulse gate within the target track; and for every laser pulse received within the pulse gate crossing the noise threshold, determining a time index relative to the pulse gate center; and a memory for storing the pulses that cross the noise threshold and their respective time index, wherein the processor further temporally offsets the stored pulses based on their corresponding time indexes, sums the offset pulses together to generate a summed pulse signal, and determines the line-of-sight error to the target from the summed pulse signal.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAILED DESCRIPTION

In some embodiments, the disclosed invention is system and method for semi-active laser pulse stacking for improving signal-to-noise radio (SNR) of the processed laser signal and therefore improving target acquisition range. The disclosed invention mitigates low reflectivity targets by taking advantage of enhanced processing and the inherent high sampling rate (typically much higher than standard pulse repetition frequencies on the laser platforms) found on modern digital SAL systems. The high sampling rate allows for an increase in the pulse repetition frequency (PRF)

(nominally 20 Hz) of the coded laser signal presented on the target, for example, to greater than 50 MHz although improvements are realizable at much more realistic laser PRF (e.g. 100 Hz). With an increased number of pulses, a pulse summing technique is utilized to improve the SNR of the signal within the required guidance time constant of the missile (nominally 10 Hz). The process utilized by the disclosed invention identifies pulse signals crossing a predetermined threshold at a SNR less than half the conventional track thresholds and then sums sufficient number of laser pulses to increase the effective SNR of the laser signal.

Figure 1:
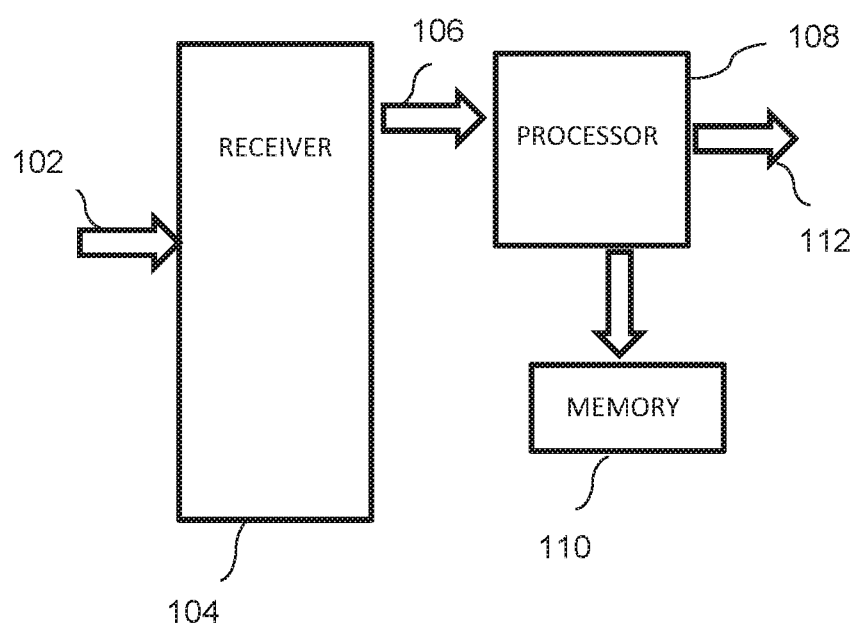
FIG. 1 is a simplified block diagram of a semi-active laser sensor with pulse stacking, according to some embodiments of the disclosed invention.

FIG. 1 is a simplified block diagram of a semi-active laser sensor with pulse stacking, according to some embodiments of the disclosed invention. As shown, the SAL sensor includes an optical receiver 104 for receiving a series of laser pulses 102 reflected from a target that is illuminated by a laser signal. In some embodiments, the optical receiver 104 includes optical components, such as lenses, for receiving and focusing the laser pulses 102 from a line-of-sight from the target. The optical receiver 104 also includes a photodetector for converting the optical (laser) signal to an electrical signal, amplifiers for amplifying the electrical signal and filters for filtering noise from the electrical signals.

The electrical signals 106 converted from the laser pulses are then input to a processor 108. Processor 108 processes the electrical signals, sets a noise threshold, and starts a target track file which sets a track gate with a time window associated with the known laser PRF. Processor 108 also identifies pulse signals in each track that cross the threshold, determines their time index and stores them in a memory 110. Processor 108 then offsets the stored identified pulse that crossed the threshold by their corresponding time index to temporally stack them over each other, summing the stacked pulses to generate a high-SNR 112 laser pulse measurement. The high-SNR laser pulse measurement can then be used to determine the line of site to the target followed by the projectile.

Figure 2:
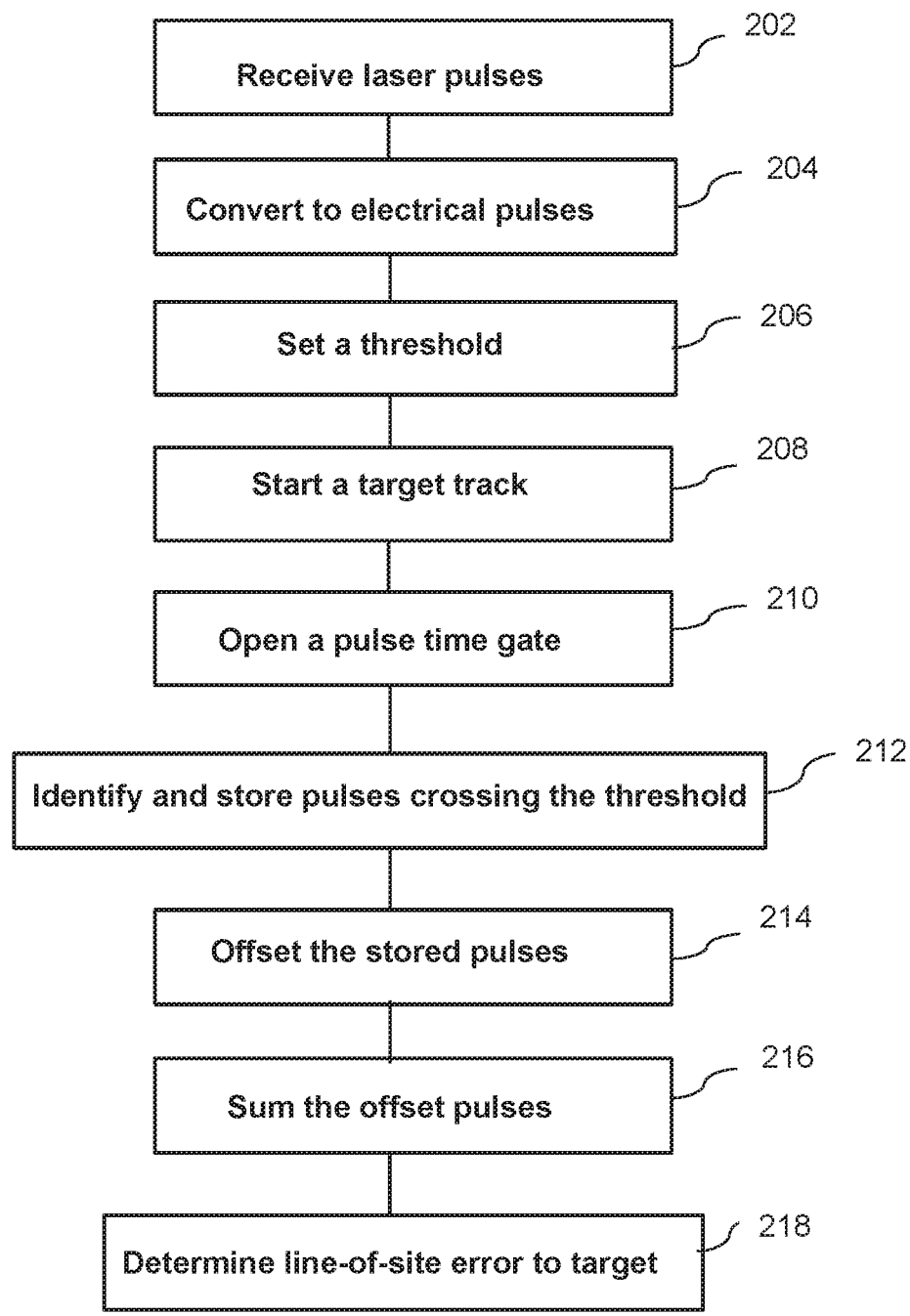
FIG. 2 is a process flow diagram, according to some embodiments of the disclosed invention.

FIG. 2 is a process flow diagram, according to some embodiments of the disclosed invention. As shown in block 202, the laser signal reflected from a target is received by a projectile, a missile, or a moving platform. The high bandwidth and sampling rate of the digital systems, including the optical receiver and 104 the processor 108 depicted in FIG. 1 allows an increase in the frequency of the laser pulses directed to and reflected from the target. This increase in the frequency of the laser pulse provides an increase in the number of measured signals and therefore a more accurate line-of-sight (LOS) error estimate to the target. In block 204, the laser pulses are converted to electrical pulses (for example, by a photodetector), amplified and processed, as known in the art.

In block 206, a noise threshold is set for the laser (electrical) pulses to determine a target track. A target track is a set of associated observations that represents the current state estimate of a single target's location and typically contains state estimates (in two or three dimensions) as well as a unique track number. The laser track thresholds are typically set to about twice the three-sigma noise distribution to ensure that only the targets (not noise in the system or environment) start a laser track. However, when the stream of pulses from a laser designator are summed as described below, the threshold can be lowered to about three-sigma and thus only samples that cross this lower threshold are summed. For example, according to the disclosed invention, the threshold can be set at a SNR less than half of the conventional track thresholds, because sufficient number of laser pulses are summed to increase the effective SNR of the laser signal. In some embodiments, the threshold is tunable and can dynamically change based on the system requirements, target type and the environment. For example, if the processor has sufficient bandwidth to process a larger number of false alarms (noise threshold crossings), a lower threshold can be utilized to further improve the acquisition range increase. If on the other hand, there are a large number of noise threshold crossings due to a cluttered environment, the threshold can be dynamically increased and the increased sampling rate improves the quality of the laser signal regardless.

In block 208, a target track is started for the received (electrical) pulse (sample), based on the set threshold, that is, the signals that cross (above) the set threshold are used for the target track. In the case of multiple targets, for each target a track file is started. In some embodiments, each target may have multiple track files and the size of a target track frame may be on the order of a handful of microseconds, when the laser is operating at 20 Hz, but could be tuned smaller when the laser is operating at higher frequency. The number of samples per frame is time and mission dependent and also depends on the noise environment. If the signals don't cross the threshold, they are dropped from consideration in the pulse summing process (described below). If a predetermined number of time-windows pass without a threshold crossing, the track file for that target is dropped.

In block 210, a pulse time gate is opened within a target track. A pulse gate is a software defined temporal window with a time period where the "gate" allows signals to be considered for threshold crossings. The temporal window size is set with a frequency associated with the pulse repetition frequency, for example 20 Hz or larger. The pulse gate is used to select the target for further processing and to filter out all the other targets or false targets that might be visible to the sensor. The width of the gate is also a tunable parameter that can be set in software. For example, a narrow width is less susceptible to scene clutter, however, the narrower width will possibly reduce the opportunity of detecting a threshold crossing from the laser signal due to jitter and differences between the laser platform clock and semi-active laser sensor master clock. On the other hand, a wide width provides better opportunities for target detection, but is more susceptible to artificial and environmental noise. In some embodiments, the gate width maybe less than 1 microsecond, but more than a few times the pulse width. However, the gate width primarily depends on the timing jitter of the laser transmitter, semi-active laser sensor, and the target reflection environment (over-spill, etc.).

In block 212, for every pulse received at the input and within the pulse gate that crosses the threshold, the processor determines its time index via the sample at which the maximum amplitude of signal is received. The pulse amplitude and its time index are then stored in a memory. The number of input laser pulses that are considered for storage (and subsequent summing) is a system parameter and depends on the required accuracy, target range, and noise environment.

In block 214, the stored pulses (samples) are offset using their time index to align them temporally on top of each other. Because the samples are temporally aligned, the summation of pulses effectively cancels random noise while, adding signals together increasing the SNR. If the pulses don't cross the threshold, they are dropped from consideration.

In block 216, the offset pulses are summed (stacked) together to form a summed pulse with better angle noise performance, allowing the SAL sensor to track a signal at half the normal threshold and increase the effective SNR. In some embodiments, the disclosed invention uses the high sample rate of modern digital semi-active laser seekers (~100 MHz) coupled with higher pulse repetition frequency laser designators (traditionally set to ~20 Hz) to provide an increase in acquisition range. In some embodiments, multiple pulses are summed, allowing the signal from designator pulses to add while the noise is effectively cancelled over a series of pulse samples. This increase in SNR for a given target signal leads to an increase in acquisition range. However, the threshold for identifying pulses above the system noise level can be reduced if many pulses are added together. This way, the threshold for identifying pulses above the system noise level can be reduced when several pulses are added together.

In block 218, the line of site error to the target is determined using known methods, based on the summed pulse with low SNR. Modern digital SAL systems have large bandwidth (~100 MHz) utilized to characterize pulses, but traditionally use low pulse repetition frequencies (PRF) of about 20 Hz for laser target designators. By increasing this PRF rate a modest amount (e.g., ~60 Hz), the angle noise performance of the SAL sensor can be recovered, while increasing sensitivity by ~2×.

Figure 3:
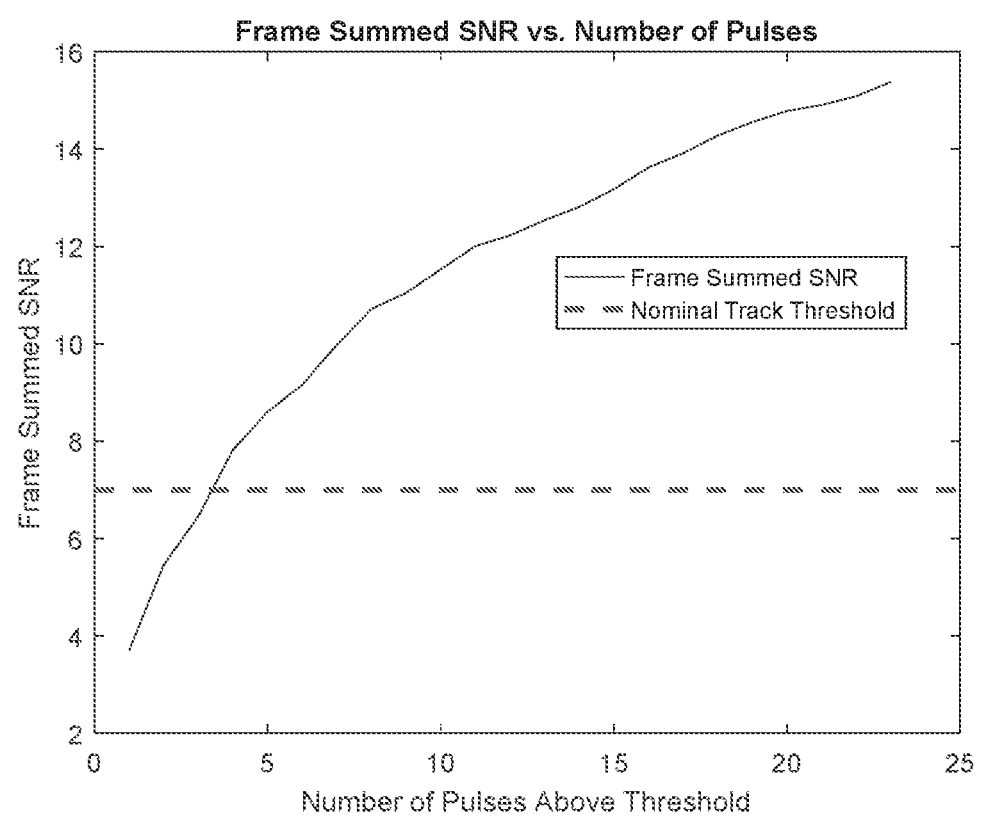
FIG. 3 is a graph illustrating results achieved by some embodiments of the disclosed invention.

FIG. 3 is a graph illustrating results achieved by some embodiments of the disclosed invention. The nominal track threshold to noise ratio shown by dashed lines is traditionally set at a radio of approximately 7 for the conventional SAL systems. However, as depicted by the solid line, as the number of pulses summed together is increased, the SNR of the summed pulse also increases, crossing the traditional ratio of 7 at about four pulses summed together.

In addition to missile guidance applications, the SAL sensor of the present invention may be used in laser communication and laser-based alignment systems that require long range performance It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

What is claimed is:

1. A method for determining a line-of-sight error to a target with a Semi-Active Laser (SAL) sensor, the method comprising:
   receiving a plurality of target pulses;
   starting a target track for pulses that cross a noise threshold;
   opening a pulse gate within the target track;
   for every laser pulse received within the pulse gate crossing the noise threshold, determining a time index relative to a pulse gate center and storing said every pulse in a memory;
   temporally offsetting the stored pulses based on their corresponding time indexes;
   summing the offset pulses together to generate a summed pulse signal; and
   determining the line-of-sight error to the target from the summed pulse signal.

2. The method of claim 1, wherein the target pulses are electrical pulses converted from a plurality of respective laser pulses.

3. The method of claim 1, further comprising directing a projectile to the target responsive to the line-of-site error.

4. The method of claim 1, further comprising establishing a communication line to the target responsive to the line-of-site error.

5. The method of claim 1, wherein the noise threshold is tunable based on the system requirements, target type and the environment.

6. The method of claim 1, wherein the noise threshold is dynamically changed based on system requirements, target type and the environment.

7. The method of claim 1, wherein the noise threshold is set to three-sigma noise distribution of the SAL sensor.

8. The method of claim 1, wherein a number of pulses summed together is in a range between 3 to 20 pulses.

9. The method of claim 1, further comprising dropping a received laser pulse from further processing when the received laser pulse fails to cross the noise threshold.

10. A Semi-Active Laser (SAL) sensor for determining a line-of-site to a target comprising:
    a receiver for receiving a plurality of target pulses;
    a processor for starting a target track for pulses that cross a noise threshold opening a pulse gate within the target track; and for every laser pulse received within the pulse gate crossing the noise threshold, determining a time index relative to a pulse gate center; and
    a memory for storing the pulses that cross the noise threshold and their respective time index, wherein the processor further
    temporally offsets the stored pulses based on their corresponding time indexes, sums the offset pulses together to generate a summed pulse signal, and determines the line-of-sight error to the target from the summed pulse signal.

11. The SAL sensor of claim 10, wherein the target pulses are electrical pulses converted from a plurality of respective laser pulses.

12. The SAL sensor of claim 10, wherein the processor further directs a projectile to the target responsive to the line-of-site error.

13. The SAL sensor of claim 10, wherein the processor further establishes a communication line to the target responsive to the line-of-site error.

14. The SAL sensor of claim 10, wherein the noise threshold is tunable based on the system requirements, target type and the environment.

15. The SAL sensor of claim 10, wherein the noise threshold is dynamically changed based on the system requirements, target type and the environment.

16. The SAL sensor of claim 10, wherein the noise threshold is set to three-sigma noise distribution of the SAL sensor.

17. The SAL sensor of claim 10, wherein a number of pulses summed together is in a range between 3 to 20 pulses.

18. The SAL sensor of claim 10, wherein the processor further drops a received laser pulse from further processing when the received laser pulse fails to cross the noise threshold.

* * * * *